United States Patent
Himmelmann et al.

(10) Patent No.: US 11,970,291 B2
(45) Date of Patent: Apr. 30, 2024

(54) TOILET AND GARMENT FOR WASTE REMOVAL IN A ZERO-GRAVITY CONDITION

(71) Applicant: Hamilton Sundstrand Space Systems International, Inc., Windsor Locks, CT (US)

(72) Inventors: Ashley Himmelmann, Hartford, CT (US); Daniel J. Kaplan, Melbourne Beach, FL (US); Jake Rohrig, Simsbury, CT (US); Rachel L LaDue, Manchester, CT (US)

(73) Assignee: HAMILTON SUNDSTRAND SPACE SYSTEMS INTERNATIONAL, INC., Windsor Locks, CT (US)

( * ) Notice: Subject to any disclaimer, the term of this patent is extended or adjusted under 35 U.S.C. 154(b) by 205 days.

(21) Appl. No.: 17/714,377

(22) Filed: Apr. 6, 2022

(65) Prior Publication Data
US 2023/0322420 A1    Oct. 12, 2023

(51) Int. Cl.
*B64G 1/60*    (2006.01)
(52) U.S. Cl.
CPC ..................... *B64G 1/60* (2013.01)
(58) Field of Classification Search
CPC ........................................................ B64G 1/60
USPC .......................................................... 4/316
See application file for complete search history.

(56) References Cited

U.S. PATENT DOCUMENTS

| | | | |
|---|---|---|---|
| 3,329,974 A | 7/1967 | Belasco et al. | |
| 3,340,543 A | 9/1967 | Cella | |
| 3,340,544 A | 9/1967 | Cella | |
| 3,626,941 A | 12/1971 | Webb | |
| 3,805,303 A * | 4/1974 | Brown | A47K 13/00 4/316 |
| 4,955,090 A | 9/1990 | Stefan | |
| 5,342,583 A * | 8/1994 | Son | A61F 5/451 4/453 |
| 5,350,369 A * | 9/1994 | Workman | A61G 5/04 5/604 |
| 8,394,074 B2 * | 3/2013 | Piette | A61F 5/451 604/352 |
| 2020/0146872 A1 | 5/2020 | Jia | |

FOREIGN PATENT DOCUMENTS

WO    2020209136 A1    10/2020

* cited by examiner

*Primary Examiner* — Huyen D Le
(74) *Attorney, Agent, or Firm* — CANTOR COLBURN LLP

(57) ABSTRACT

A toilet for a zero-gravity condition, having: a seat extending from a first end to a second end, and from a first side to a second side; a leg rest at the first end of the seat that is level with the seat; a backrest at the second end of the seat that extends away from the seat, toward an outer end of the toilet, a first sidewall at the first side of the seat and a second sidewall at the second side of the seat, the sidewalls extend away from the seat toward the outer end of the toilet; a basin extending away from the seat toward an inner end of the toilet; a first inflatable member extending about the leg rest, the sidewalls and the backrest, the first inflatable member is configured to inflate against a back, sides and under legs of a person seated against the seat.

20 Claims, 9 Drawing Sheets

TOILET AND GARMENT FOR WASTE REMOVAL IN A ZERO-GRAVITY CONDITION

BACKGROUND

The embodiments are directed to waste removal systems and more specifically to a toilet and a garment for waste removal in a zero-gravity condition.

Traditional, terrestrial solutions to human waste collection and management typically do not translate for microgravity or uncertain gravity applications. Lavatory solutions that address this problem are failure prone, are expensive, and accommodate limited body types.

BRIEF SUMMARY

Disclosed is a toilet for a zero-gravity condition, including: a seat extending from a first end to a second end, and from a first side to a second side; a leg rest at the first end of the seat that is level with the seat; a backrest at the second end of the seat that extends away from the seat, toward an outer end of the toilet, a first sidewall at the first side of the seat and a second sidewall at the second side of the seat, wherein the sidewalls extend away from the seat toward the outer end of the toilet; a basin extending away from the seat toward an inner end of the toilet; a first inflatable member extending about the leg rest, the sidewalls and the backrest, wherein the first inflatable member is configured to inflate against a back, sides and under legs of a person seated against the seat.

In addition to one or more of the above disclosed aspects of the toilet, or as an alternate, the seat is removably supported by the toilet.

In addition to one or more of the above disclosed aspects of the toilet, or as an alternate, the sidewalls respectively define first ends that face the outer end of the toilet and second ends that faces away from the backrest; and the first inflatable member extends along the first ends and the second ends of the sidewalls.

In addition to one or more of the above disclosed aspects of the toilet, or as an alternate, the backrest is taller than each of the sidewalls, and the first inflatable member extends along the backrest so that it is level with the first ends of each of the sidewalls.

In addition to one or more of the above disclosed aspects of the toilet, or as an alternate, the leg rest includes a center partition that extends away from the seat, toward the outer end of the toilet, to define adjacent first and second leg-rest cavities between the sidewalls, and the first inflatable member extends over the center partition, wherein when the person is seated against the seat, the first inflatable member is configured to inflate under and partially around the legs of the person.

In addition to one or more of the above disclosed aspects of the toilet, or as an alternate, the first sidewall defines a first outer corner where the first and second ends of the first sidewall meet, and the second sidewall defines a second outer corner where the first and second ends of the first sidewall meet, and the toilet includes: a lap bar having opposing ends that are spaced apart from each other by a distance that is complimentary to spacing between the sidewalls, wherein the lap bar is configured to be positioned against the outer corners of the sidewalls and extend continuously therebetween, and wherein the lap bar is configured to be releasably fixed against the outer corners of the sidewalls; and a second inflatable member extending between the opposing ends of the lap bar, wherein, when the person is seated against the seat, the second inflatable member is configured to inflate against portions of the legs and waist of the person that are otherwise exposed by the first inflatable member to form a seal around the person.

In addition to one or more of the above disclosed aspects of the toilet, or as an alternate, a waste outlet port is defined at the inner end of the toilet.

In addition to one or more of the above disclosed aspects of the toilet, or as an alternate, the toilet includes a spray nozzle extending into the basin, between the inner end of the toilet and the seat, wherein the spray nozzle is configured to direct a spray toward the seat.

In addition to one or more of the above disclosed aspects of the toilet, or as an alternate, the toilet includes an air duct extending through the backrest, between the seat and the first inflatable member, and the air duct is configured to direct air toward the seat.

In addition to one or more of the above disclosed aspects of the toilet, or as an alternate, the sidewalls respectively define pockets with gloves extending therethrough.

Further disclosed is a garment for disposing human waste in a zero-gravity condition, including: a pelvis enclosure, extending from an outer end to an inner end; a waist opening at the outer end of the garment; the inner end of the garment defines leg openings and a waste collection chamber between the leg openings, wherein the waste collection chamber includes: a conduit connector that defines a plurality of ports, including a fluid inlet port and a waste outlet port; and a baffle fluidly coupled to the fluid inlet port, wherein the baffle defines a fluid nozzle that is configured to direct a fluid flow from the fluid inlet port toward the outer end of the garment, wherein when a person is wearing the garment, the baffle is configured to be located between legs, and adjacent to a perineum, of the person.

In addition to one or more of the above disclosed aspects of the toilet, or as an alternate, the garment includes leg sleeves extending away from respective ones of the leg openings to sleeve ends.

In addition to one or more of the above disclosed aspects of the toilet, or as an alternate, the garment includes inflatable members at each of the waist opening and the sleeve ends, wherein when the garment is worn by the person, the inflatable members are configured to inflate about a waist and the legs of the person to create a seal.

In addition to one or more of the above disclosed aspects of the garment, or as an alternate, a rigid shell surrounds the waste collection chamber.

In addition to one or more of the above disclosed aspects of the garment, or as an alternate, the rigid shell is formed of plastic and the leg sleeves are formed of silicone.

In addition to one or more of the above disclosed aspects of the garment, or as an alternate, the plurality of ports further includes a first gas inlet port; and a conduit within the waste collection chamber is fluidly connected to the first gas inlet port, wherein the conduit defines a first gas nozzle that is configured to direct gas flow from the first gas inlet port into the waste collection chamber.

In addition to one or more of the above disclosed aspects of the toilet, or as an alternate, the garment includes a pinch valve to control outflow from at least one of the baffles and the conduit.

In addition to one or more of the above disclosed aspects of the garment, or as an alternate, the garment defines a gloved opening that is configured to provide access into the waste collection chamber.

Further disclosed is a system including a garment having one or more of the above disclosed features; and an inflatable seat with hand grips with a seating zone that is configured to be positioned against the inner end of the garment.

In addition to one or more of the above disclosed aspects of the system, or as an alternate, the system includes magnets disposed along the seating zone of the inflatable seat and the inner end of the garment to prevent slipping motion between the garment and the inflatable seat.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

Figure 1:
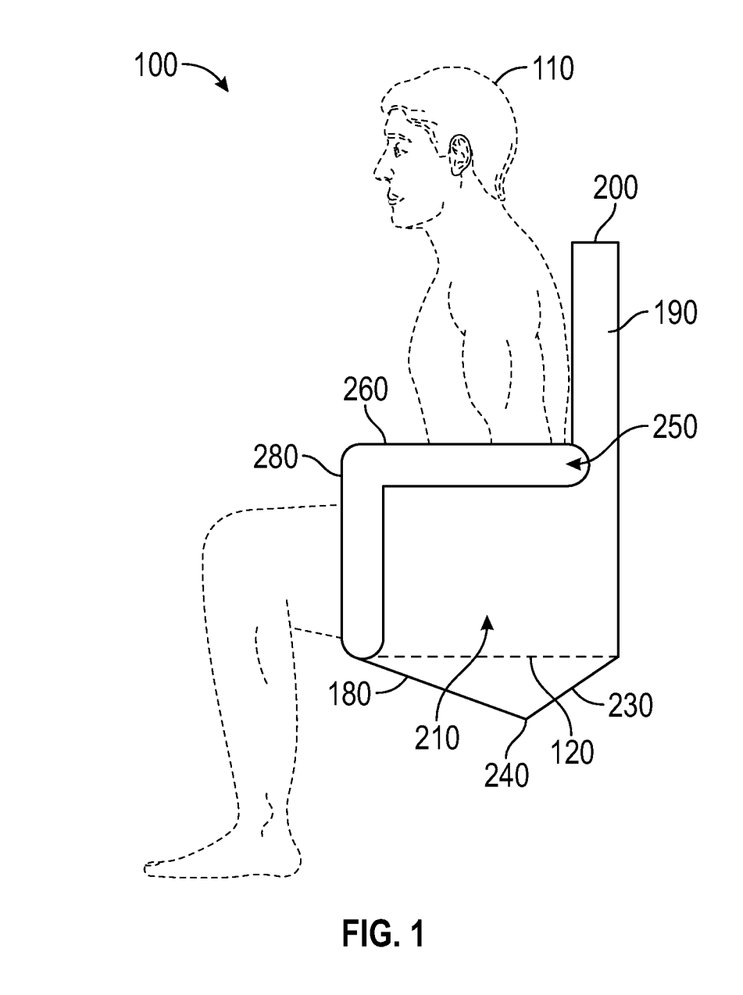
FIG. 1 shows a toilet according to an embodiment with a person seated in the toilet.
Figure 2:
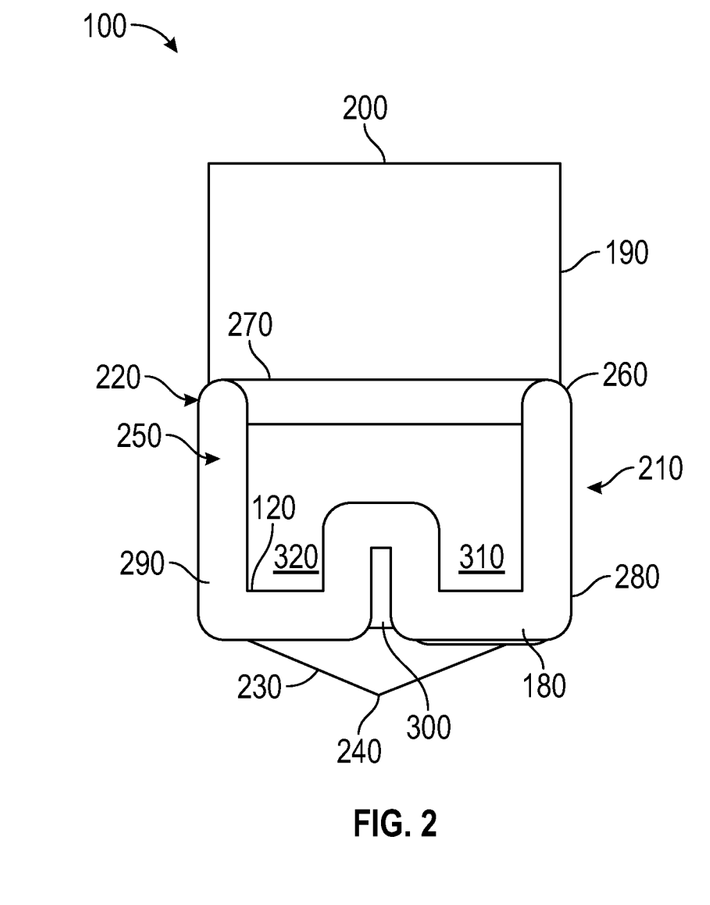
FIG. 2 shows one view of the toilet, facing a toilet backrest.
Figure 3:
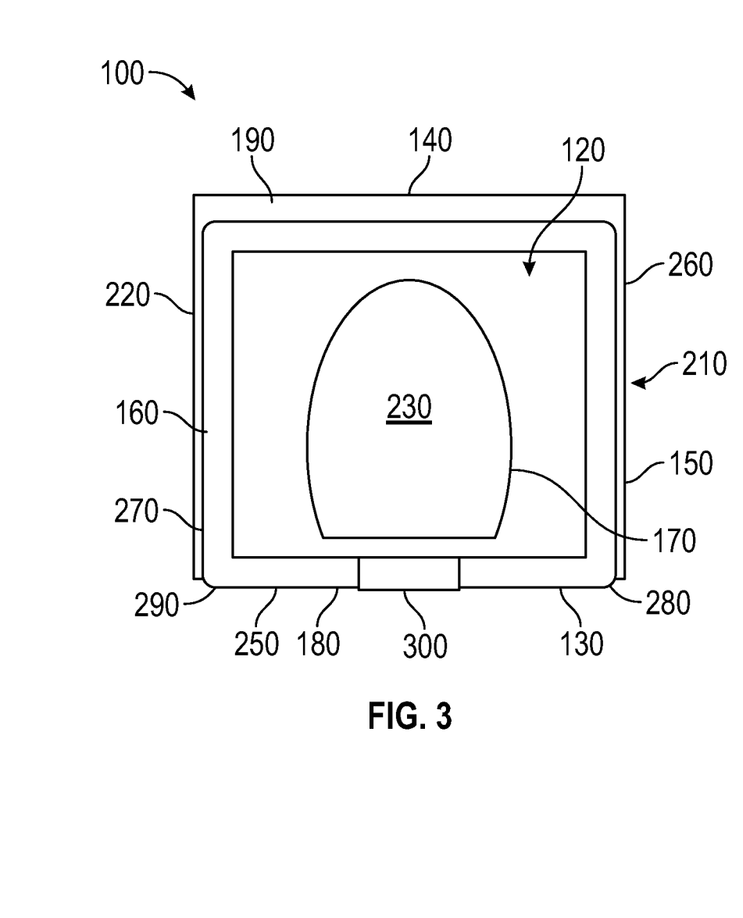
FIG. 3 shows another view of the toilet, facing a toilet basin.

Turning to FIGS. 1-3, a toilet 100 for a zero-gravity condition is shown, with a person 110 utilizing the toilet 100 (FIG. 1). The toilet 100 is generally chair shaped and includes a seat 120 (FIG. 3). The seat 120 extends from a first end 130 to a second end 140 and from a first side 150 to a second side 160. The seat 120 may be a platform that defines a center opening 170 similar to a standard clam shell toilet seat. The seat 120 may be removably supported in the toilet 100 to enable cleaning the toilet 100.

A leg rest 180 is located at the first end 130 of the seat 120 and is level with the seat 120. A backrest 190 is located the second end 140 of the seat 120 and it extends away from the seat 120, toward an outer end 200 of the toilet 100. A first sidewall 210 is located at the first side 150 of the seat 120 and a second sidewall 220 is located the second side 160 of the seat 120. The sidewalls 210, 220 extend away from the seat 120 toward the outer end 200 of the toilet 100. A basin 230 extends away from the seat 120 toward an inner end 240 of the toilet 100.

A first inflatable member 250 extends about the leg rest 180, the sidewalls 210, 220 and the backrest 190. When a person 110 is seated against the seat 120, the first inflatable member 250 is configured to inflate against a back, sides and under legs of the person 110.

The sidewalls 210, 220 may respectively define first ends 260, 270 that faces the outer end 200 of the toilet 100 and second ends 280, 290 that faces away from the backrest 190. The first inflatable member 250 may extend along the first ends 260, 270 and the second ends 280, 290 of the sidewalls 210, 220.

The backrest 190 may be taller than each of the sidewalls 210, 220. The first inflatable member 250 may extend along the backrest 190 so that it is level with the first ends 260, 270 of each of the sidewalls 210, 220.

The leg rest 180 may include a center partition 300 that extends away from the seat 120, toward the outer end 200 of the toilet 100, to define adjacent first and second leg-rest cavities 310, 320 between the sidewalls 210, 220. The first inflatable member 250 extends over the center partition 300. With this configuration, when the person 110 is seated against the seat 120, the first inflatable member 250 is configured to inflate under and partially around the legs of the person 110.

Figure 4:
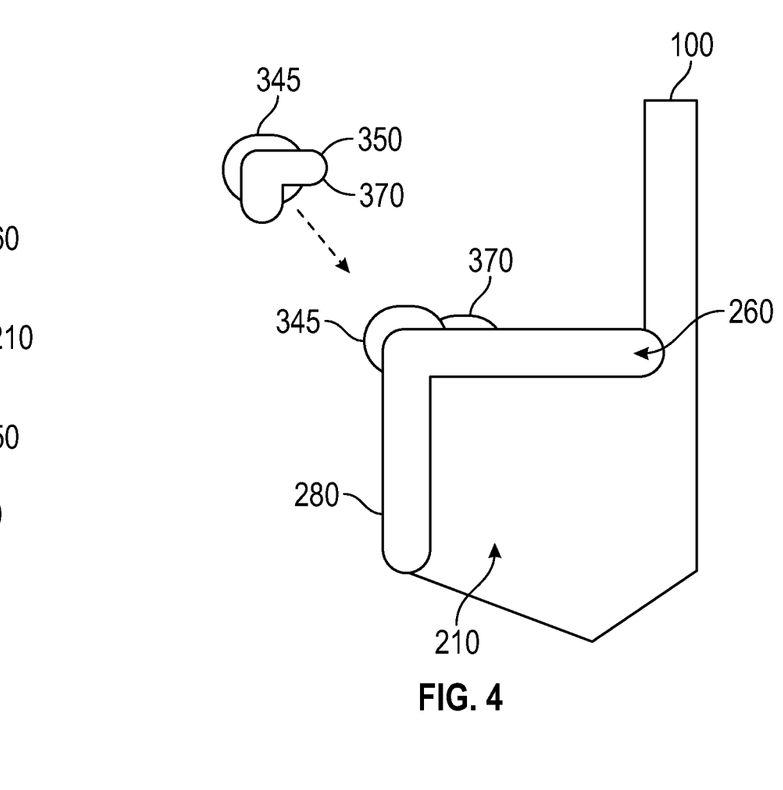
FIG. 4 shows the view of FIG. 1, without the person and with a lap bar that is configured to be utilized with the toilet.
Figure 5:
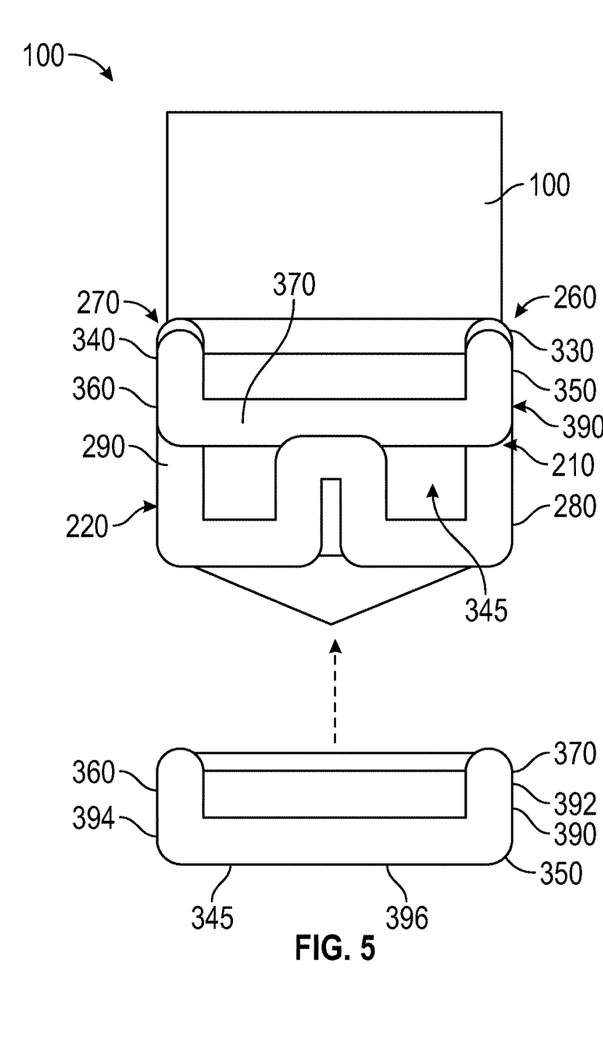
FIG. 5 shows the view of FIG. 2, with the lap bar that is configured to be utilized with the toilet.
Figure 6:
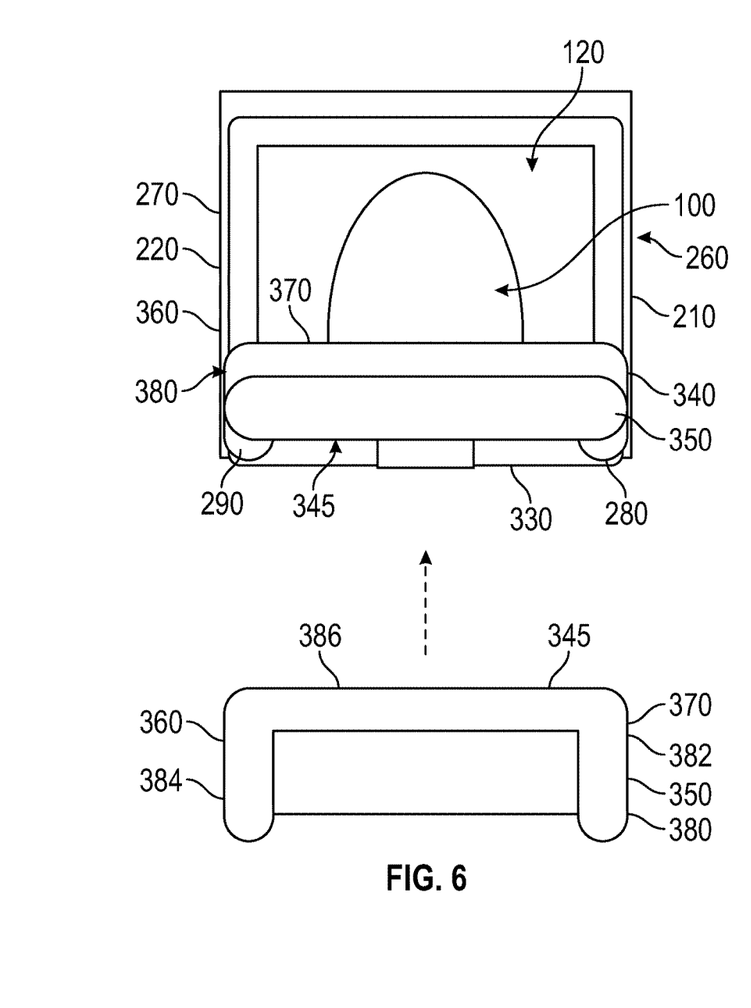
FIG. 6 shows the view of FIG. 3, with the lap bar that is configured to be utilized with the toilet.

Turning to FIGS. 4-6 the first sidewall 210 may define a first outer corner 330, where the first and second ends 260, 280 of the first sidewall 210 meet. The second sidewall 220 may define a second outer corner 340, where the first and second ends 270, 290 of the second sidewall 220 meet.

The toilet 100 may include a lap bar 345. The lap bar 345 may have opposing ends 350, 360 that are spaced apart from each other by a distance that is complimentary to the spacing between the sidewalls 210, 220. The lap bar 345 may be configured to seat against the outer corners 330, 340 of the sidewalls 210, 220 and extend continuously therebetween. The lap bar 345 may be configured to be releasably fixed against the outer corners 330, 340 of the sidewalls 210, 220, e.g., with the use of one or more latches, pivots, as non-limiting examples. The lap bar 345 may be configured to be removed, flip up, rotate to one side, as non-limiting examples.

A second inflatable member 370 may extend between the opposing ends 350, 360 of the lap bar 345. The second inflatable member 370 may be an inflatable tube. The second inflatable member 370 may be configured with a first segment 380 that extends toward the backrest 190 to partially cover the first ends 260, 270 of the sidewalls 210, 220. The first segment 380 may form a first U-shape. The first segment 380 may have segments 382, 384 that extend over the first ends 260, 270 of the sidewalls 210, 220, away from the corners 330, 340 of the sidewalls 210, 220 and a first cross-portion 386 extending between the first ends 260, 270 of the sidewalls 210, 220.

The second inflatable member 370 may be configured with a second segment 390 that extends toward the inner end 240 of the toilet 100 to partially cover the second ends 280, 290 of the sidewalls 210, 220. The second segment 390 may form a second U-shape that is continuous with the first U-shape. The second segment 390 may have segments 392, 394 that extend over the second ends 280, 290 of the sidewalls 210, 220, away from the corners 330, 340 of the sidewalls 210, 220 and a second cross-portion 396 extending between the second ends 280, 290 of the sidewalls 210, 220.

Figure 7:
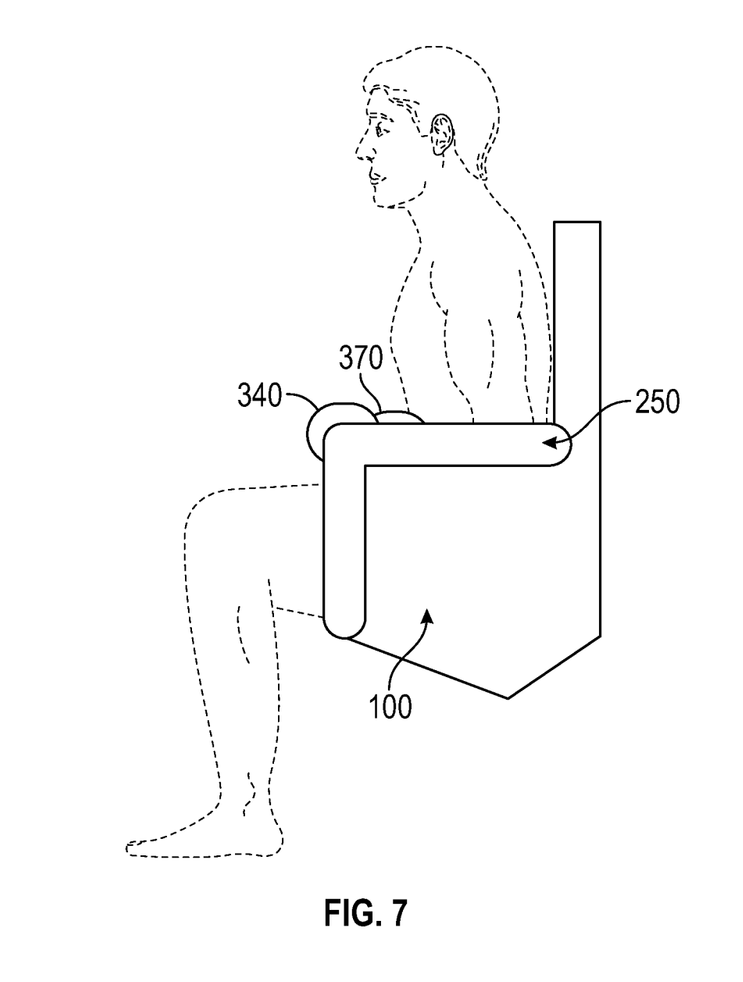
FIG. 7 shows the view of FIG. 4, with a person utilizing the toilet and the lap bar engaged.
Figure 8:
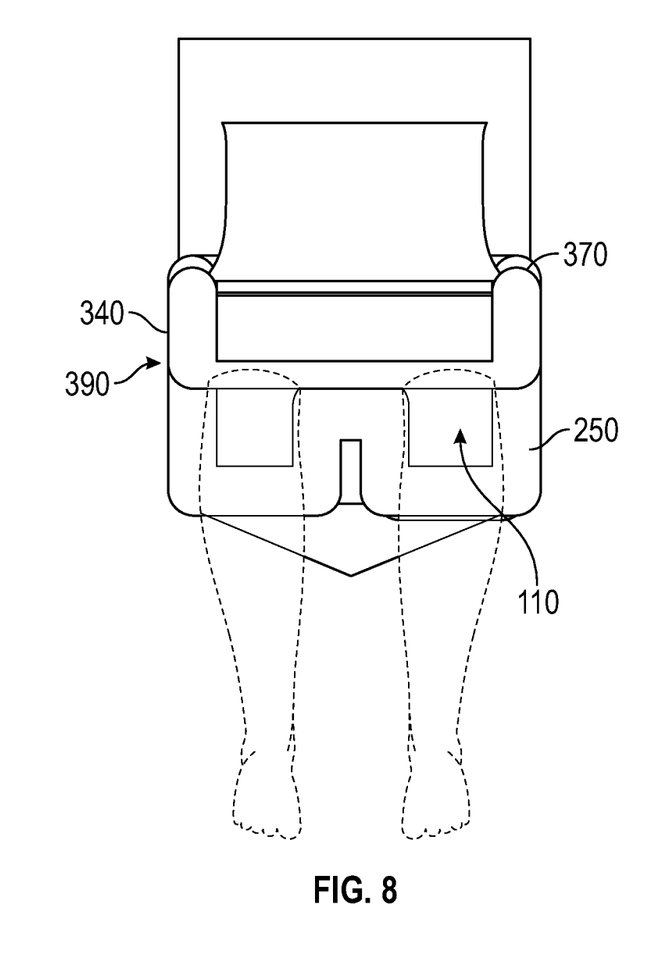
FIG. 8 shows the view of FIG. 5, with a person utilizing the toilet and the lap bar engaged.
Figure 9:
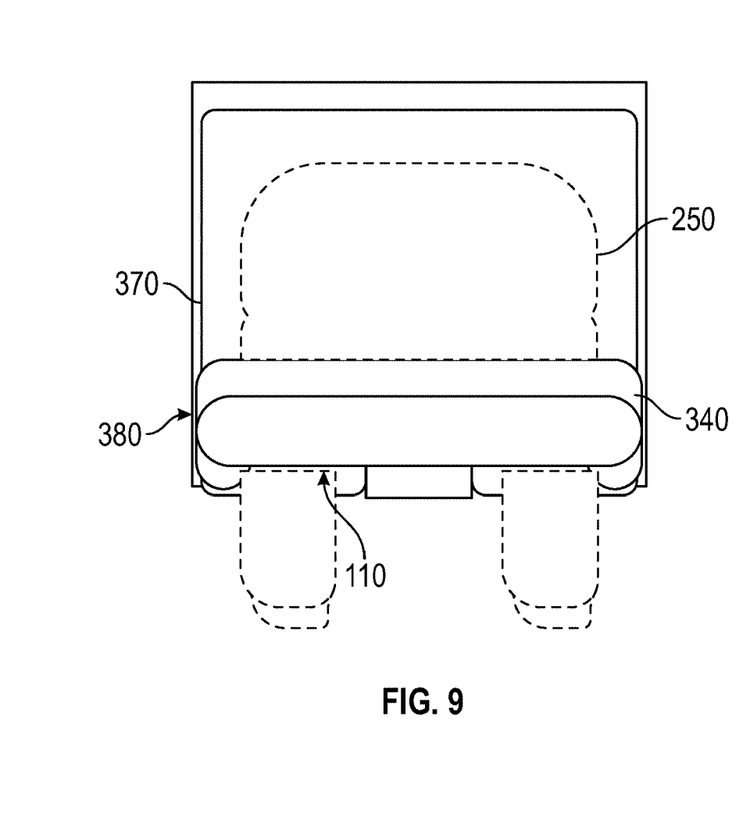
FIG. 9 shows the view of FIG. 6, with a person utilizing the toilet and the lap bar engaged.

Turning to FIGS. 7-9, a person 110 is shown utilizing the toilet 100. The lap bar 345 in place and the first and second inflatable members 250, 370 are inflated. As shown in the figures, when the person 110 is seated against the seat 120, the second inflatable member 370 may be configured to inflate against portions of the legs and waist of the person 110 due to its first and second segments 380, 390. These regions of the person 110 may be otherwise exposed by the first inflatable member 250. Thus, the combination of inflatable members 250, 370 form a seal around the person 110.

Figure 10:
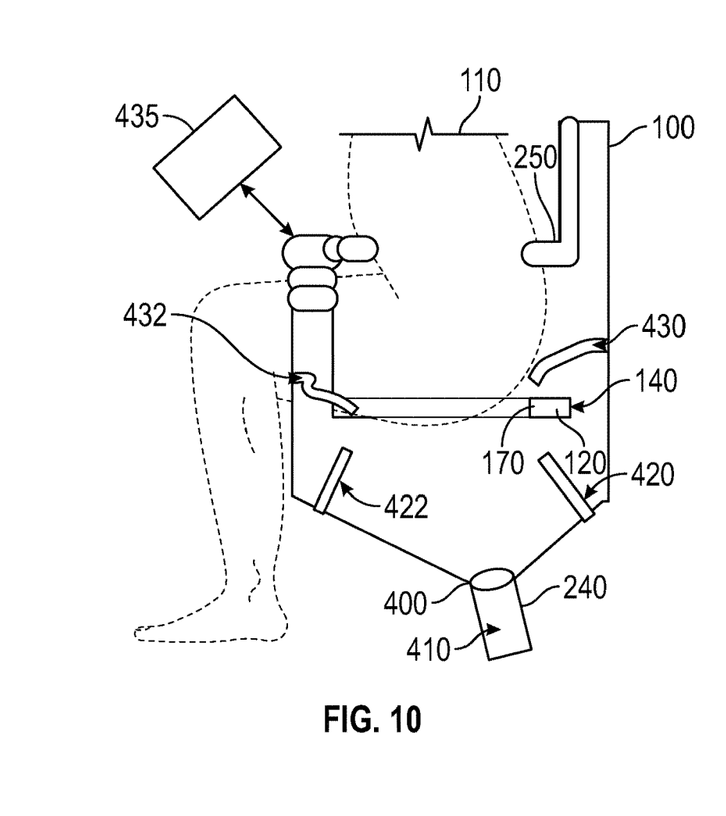
FIG. 10 shows water and air nozzles of the toilet.

Turning to FIG. 10, a waste outlet port 400 may be defined at the inner end 240 of the toilet 100, in the basin 230. The waste outlet port 400 may be connected to a suction tube 410. A spray nozzle 420 may extend into the basin 230, between the toilet inner end 240 and the seat 120. The spray nozzle 420 is configured to direct a spray toward the seat 120. In one embodiment, two spray nozzles 420, 422 may be provided, one near the first end 130 of the seat 120, and one near the second end 140 of the seat 120, to provide multiple streams of fluid toward the person 110. With this configuration the toilet 100 forms a bidet.

An air duct 430 may extend through the backrest 190, between the seat 120 and the first inflatable member 250. In one embodiment, two air ducts 430, 432, are provided, one near the first end 130 of the seat 120, and one near the second end 140 of the seat 120, to provide multiple jets of air toward the person 110. The air ducts 430, 432 are configured to direct air toward the seat 120, to urge waste toward the opening 170 in the seat 120. Air from the air ducts 430 directs waste and can also be used to dry the person. Generally, the spray nozzles can be adjusted with gloved hands (discussed below) and can also be automatically adjusted using electronic controls incorporated into the toilet 100, e.g., via an electronic user interface 435 operationally connected to the toilet 100.

Figure 11:
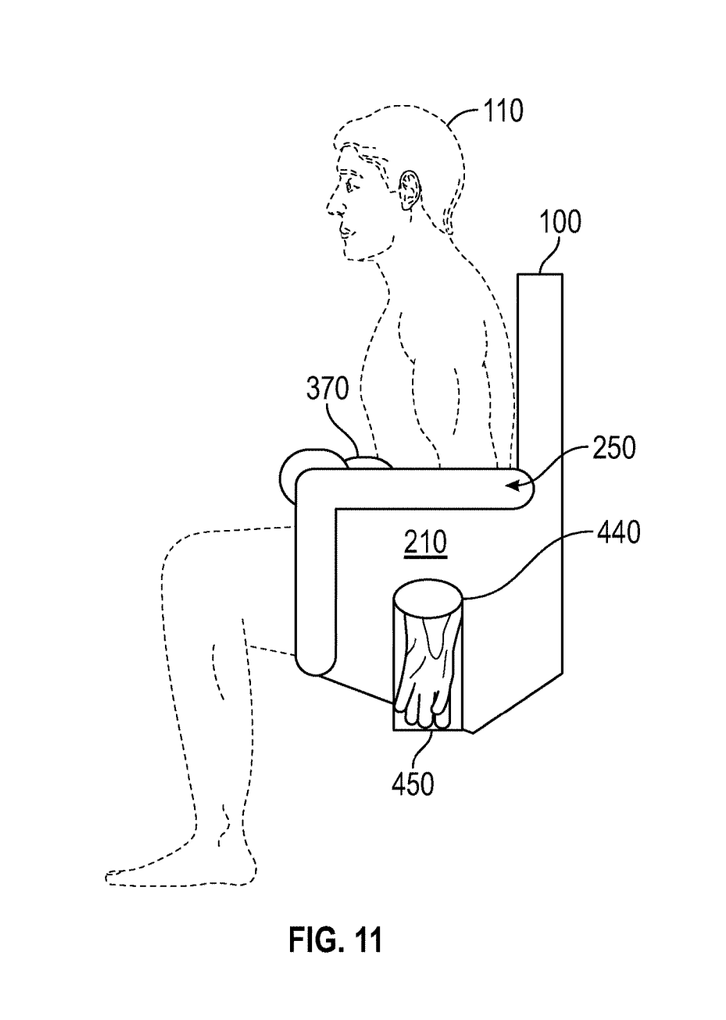
FIG. 11 shows a sidewall of the toilet with a pocket and glove.

As shown in FIG. 11, the sidewalls 210, 220 may respectively define pockets 440 with gloves 450 extending therethrough. Only one sidewall, pocket and glove is shown, though the other sidewall, pocket and glove would have the same appearance. This enables the person 110 to use their hands to adjust features such as the direction of spray of the fluid nozzles 420, 422 and the direction of air from the air ducts 430, 432. With this configuration, such adjustments may be executed without impacting the seal of the inflatable members 250, 370 about the person 110.

An example of utilizing the embodiments include sitting in the seat and inflating the inflatable members, or cuffs. Then the air jets and suction ports are activated. Once the person has completed evacuating, the cleaning flow, e.g. of water, is activated to clean the person. Then the flow is turned off and the air jets, which are still on, dry the person. The suction and air jets are then turned off, the cuffs are deflated and the person removes themself from the toilet, which is stored for cleaning.

The above embodiments function akin to toilets on earth, with modifications that allow for use in zero gravity. The embodiments utilize a clam shell seat design, with a portion functioning as a seat and a collection/cleaning manifold, and another portion (the lap bar) sealing the system. The seals form inflatable cuffs around the thighs and waist of the user, ensuring that no waste escapes. Bidet-like adjustable nozzles clean the user. Directed air current is used to guide the flow of waste and cleaning fluid as well as dry the user after cleaning. The embodiments may include a self-cleaning function, acoustic muffling, lap bar display and setting adjustment. Regarding the self-cleaning function, after user exits system, additional seals may plug the openings utilized for the user's waist and thighs and the system can either undergo a cleaning fluid or temperature-based sterilization procedure. The embodiments are configured to remove all material state (solid/liquid/gas) waste simultaneously, is capable of being utilized for multiple body types, reduces consumables, and improves the overall user experience. The embodiments enable their use without a full removal of garments. As indicated, the embodiments are sealed via inflatable seals around the thighs and waist, ensuring that no waste leaves the lavatory region. Cleaning nozzles functioning as a bidet are used to clean the user rather than toilet paper. Air current is used to direct the flow of waste/fluid and dry the user after cleaning. The embodiments isolate smells or sounds within basin, e.g., the waste chamber. The embodiments also provide an attachment to multiple types of waste management systems via the bottom port which functions as an umbilical connection.

Figure 12:
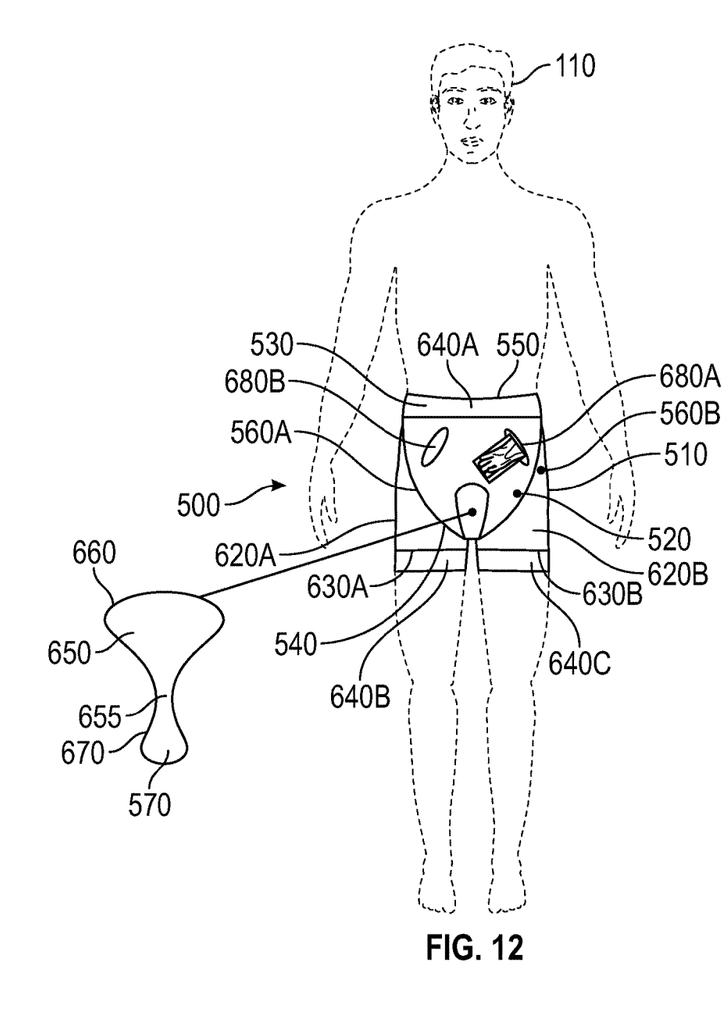
FIG. 12 shows a garment according to an embodiment worn by a person.
Figure 13:
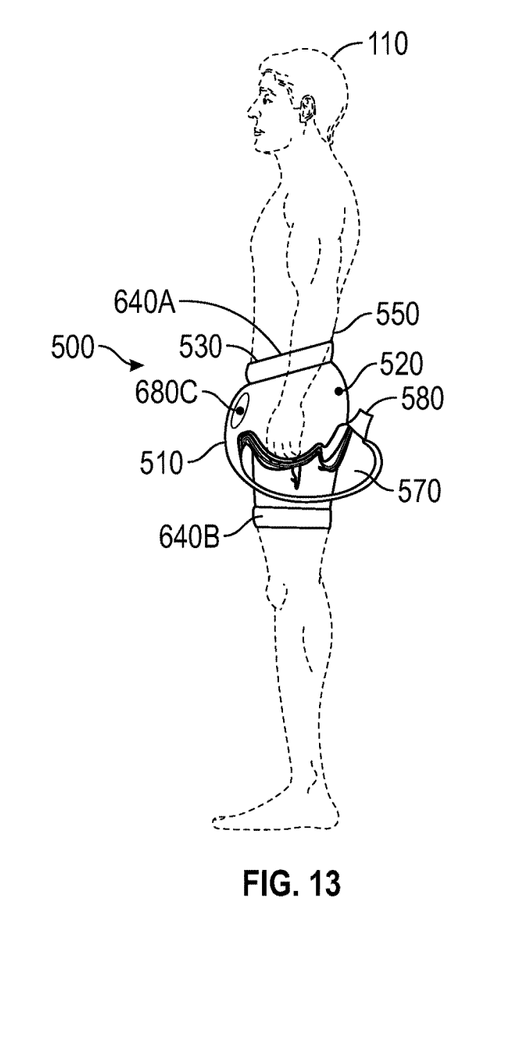
FIG. 13 shows another view of the garment.
Figure 14A:
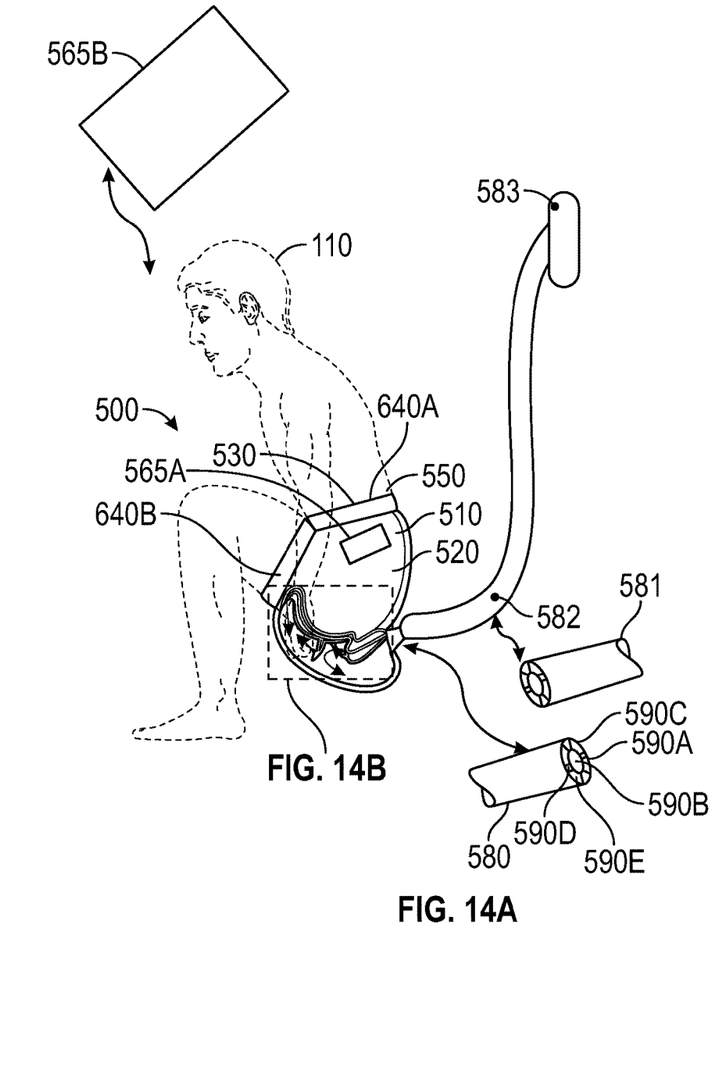
FIG. 14A shows the garment connected to a utility tube.
Figure 14B:
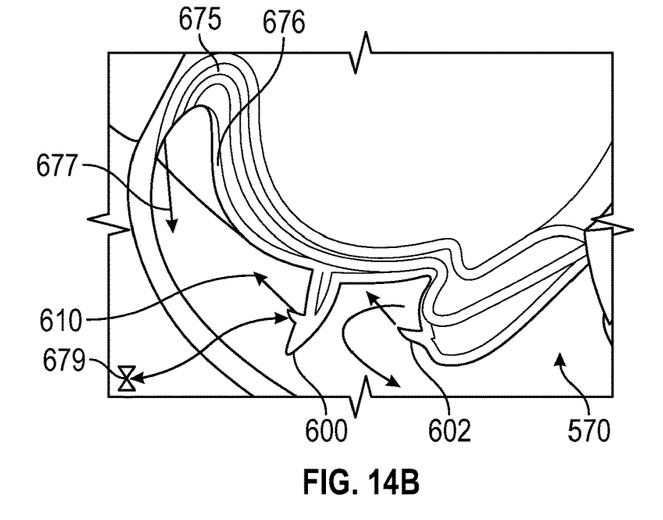
FIG. 14B shows a detail of the garment connected to a utility tube.

Turning now to FIGS. 12-14(A and B), disclosed is a system 500 that includes a garment 510, worn by a person 110, for disposing human waste in a zero-gravity condition. The garment 510 includes a pelvis enclosure 520, extending from an outer end 530 to an inner end 540 of the garment 510. A waist opening 550 is defined at the outer end 520 of the garment 510. The inner end of the garment 510 defines first and second leg openings 560A, 560B. A waste collection chamber 570 is located between the leg openings 560A, 560B.

The waste collection chamber 570 includes a conduit or utility tube connector 580 that defines a plurality of ports 590, including a fluid inlet port 590A and a waste outlet port 590B. A baffle 600 is fluidly coupled to the fluid inlet port 590A. The baffle 600 defines a water jet as it has a fluid nozzle 610 that is configured to direct a fluid flow from the fluid inlet port 590A toward the outer end 520 of the garment 510 to thereby engage the person 110. When a person 110 is wearing the garment 510, the baffle 600 is configured to be located between the legs and adjacent to a perineum of the person 110. As illustrated, there are two baffles 600, 602, spaced apart from each other in the waste collection chamber 570 and configured to clean different areas of a person 110 wearing the garment 510. There can be more than two of these water jets pointed in different directions. All of the water flows towards the outer end 520, but the water may first impact different parts of the body before flowing out of the outlet port 590B.

The garment 510 may include first and second leg sleeves 620A, 620B extending away from respective ones of the leg openings 560A, 560B to first and second sleeve ends 630A, 630B. First, second and third inflatable members 640A, 640B, 640C are respectively located at each of the waist opening 550 and the sleeve ends 630A, 630B. When the system is worn by the person 110, the inflatable members 640A, 640B, 640C are configured to inflate about a waist and legs of the person 110 to create a seal.

A rigid shell 650 may surround, or form, the waste collection chamber 570. This prevents unwanted movement of the baffle 600 against the body. The rigid shell may be formed of plastic while the rest of the garment 510 may be formed of a softer and more flexible material. For example, the leg sleeves 620A, 620B, and the remaining material of the garment 510, may be formed of silicone. A shape of the rigid shell 650 may be similar to a saddle in that it tapers to form a neck 655 between opposing ends 660, 670. In operation, the neck 655 is between the legs of the person 110 for comfort and the end 660 further away from the connector 580 has a larger surface area then the other end 670.

In one embodiment, the plurality of ports 590 in the connector 580 may include a gas inlet port 590C and the waste collection chamber 570 may include a conduit 675 that may be fluidly connected to the gas inlet port 590C. In such embodiment, the conduit 675 may define a gas nozzle 677 that is configured to direct gas flow (cooled/heated air) from the gas inlet port 590C into the waste collection chamber 570. It is to be appreciated that utilizing a plurality of gas ports is within the scope of the embodiments.

The connector 580 may be configured to mate with a connector 581 of a utility tube or conduit 582 that carries fluid, gasses and is configured for suctioning waste. The utility tube 582 would be connected to a waste management system 583, e.g., in a spacecraft. In one embodiment, the utility tube provides electricity for powering the inflating of the inflatable members or heating the airflow as desired, e.g., utilizing power and data lines 590D, 590E that extend through the conduit 582 and are accessible via the conduit connector 581. In such embodiment, the connector 580 and garment 510 have electrical lines and controllers as needed to provide for controlling power into and out of the garment 510. This configuration may be utilized, e.g., to power heaters, air pumps, and related controllers that may be within the garment 510 and, for example, integrated into the connector 580.

The baffle 600 may be configured with pinch valves, e.g., valve 679 that control flow through the nozzles. The pinch valves 679 could be controlled by the person via the outer end 520 of the garment, between the outflow terminals and the garment connector 580. That is, the garment could include electronic controls 565A, located at the waist opening 550 to be near the abdomen of the person. As indicated, power and data lines 590D, 590E are accessible via the connector 581 of the conduit 582, so that the pinch valves 670 can be micro-electromechanical valves controlled locally by the person, via the controls 565A, or by a display 565B on the spacecraft.

In addition, the garment may include one or more gloved openings (only one glove is shown for simplicity), such as three glove openings 680A, 680B, 680C, located about the garment 510. The opening may be utilized to provide access into the waste collection chamber 570.

Figures 15, 16:
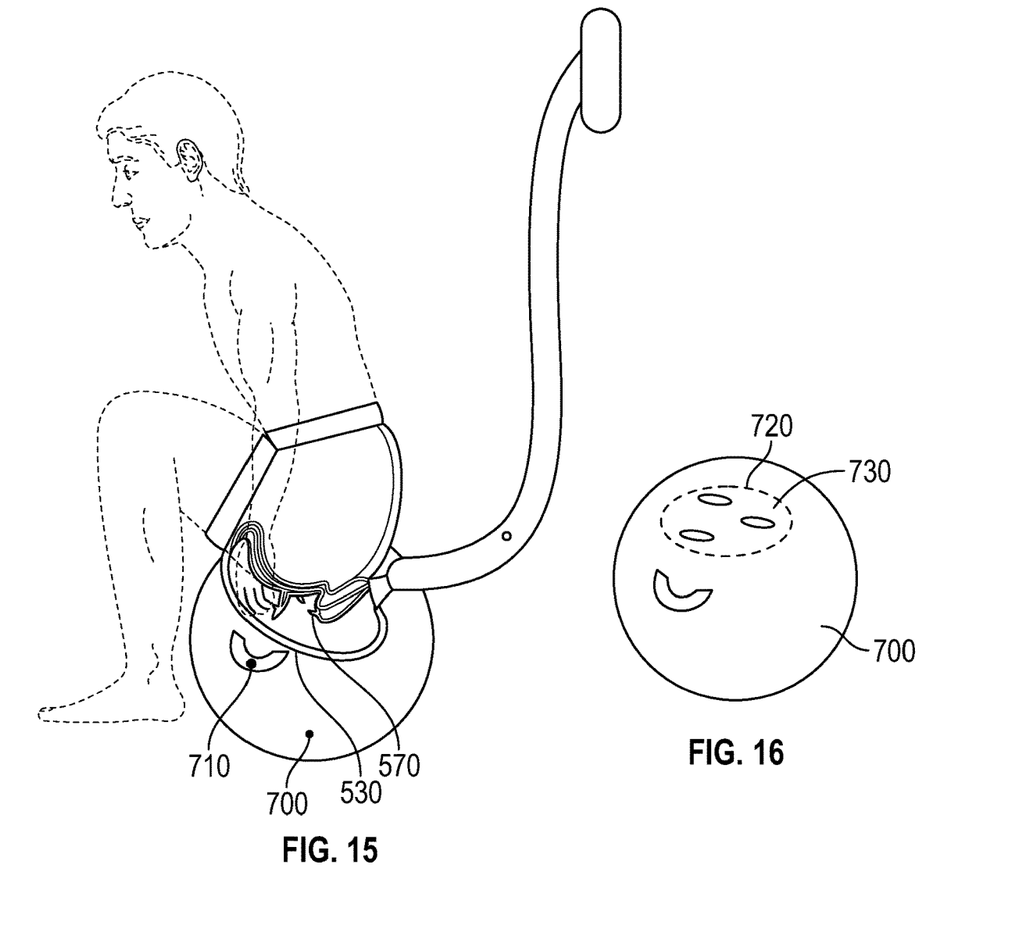
FIG. 15 shows the garment connected to an inflatable seat.
FIG. 16 shows magnets on the inflatable seat.
Figure 17:
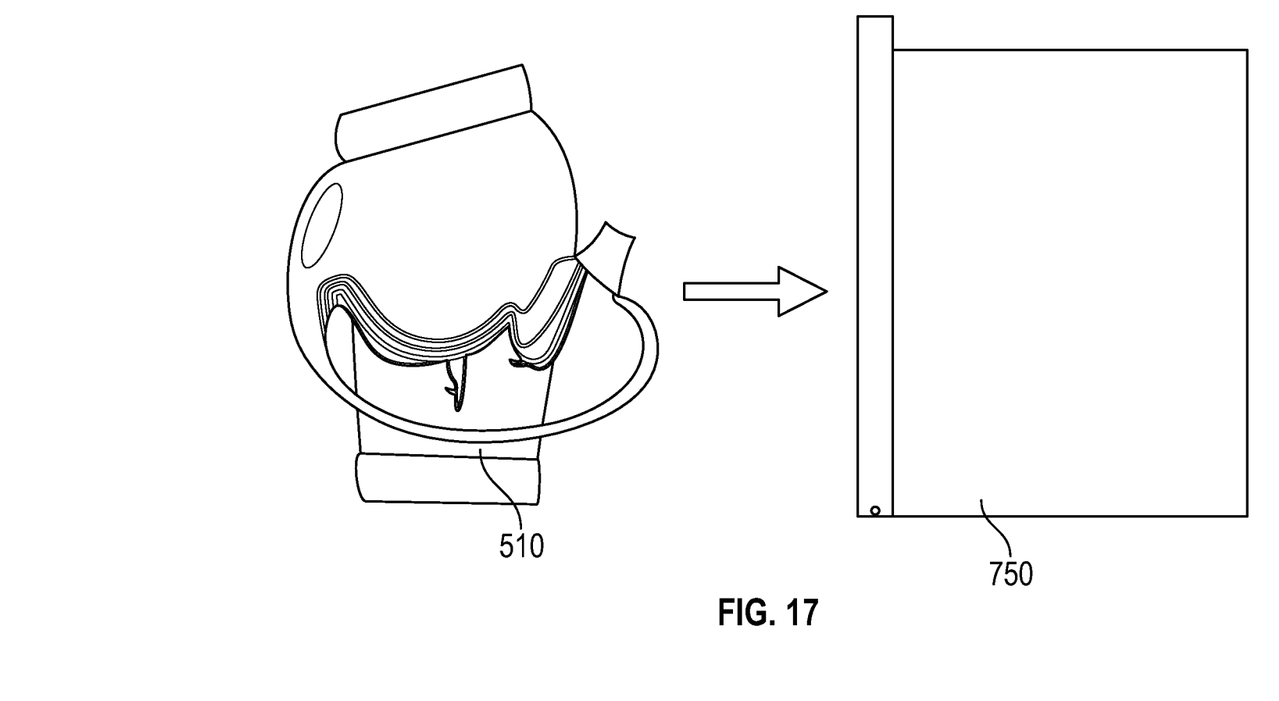
FIG. 17 shows the garment being stored after utilization.

Turning to FIGS. 15 and 16, the system 500 may include an inflatable seat 700 with hand grips 710 and with a seating zone 720 that is configured to be positioned against the inner end 540 of the garment 510, e.g., at the waste collection chamber 570. Magnets 730 may be disposed along the seating zone 720 of the inflatable seat 700 and at the inner end 540 of the garment 510 to prevent slipping motion between the garment 510 and the inflatable seat 700. Turning to FIG. 17, the garment 510 may be stored in a cabinet 750 that may be configured to sterilize the garment 510 after being utilized.

An example of utilizing the embodiments include putting on the garment and inflating the inflatable members (or cuffs). Then the air jets and suction port are activated. Once the person is completed evacuating, the cleaning flow is activated to clean the person. Then the flow is turned off and the air jets, which are still on, dry the person. The suction and air jets are then turned off, the cuffs are deflated, and the person removes themself from the garment, which is stored for cleaning.

The above embodiments provide a garment-like waste removal system primarily consisting of a soft main body wearable, a saddle like manifold for waste collection and washing, and an inflatable seal system. The materials are non-porous, medical grade materials. The baffle has bidet-like adjustable cleaning nozzles, and the garment can direct air to guide human waste and cleaning fluid, and a suction port for waste removal. Pinch valves, as an example, enable controlling outflow of the water and air jets. The seals are inflatable cuffs around the thighs and waist of the user, ensuring that no waste escapes. The embodiments include hand access pockets to self-adjust during use. The embodiments may be configured for self-cleaning an acoustic muffling.

The embodiments remove multiple types of human waste regardless of material state (solid/liquid/gas). The embodiments provide a cost-effective and customizable garment-type solution that can be utilized with multiple body types. The embodiments provide privacy and may be used in close quarters with other crewmates. The embodiments may be self-cleaning and may be sterilizable with a reduction in consumables (e.g., no wet wipes or toilet paper). The embodiments provide a focused body cleaning (e.g., shower) function via bidet jets. The embodiments are usable in multiple body positions/orientations and gravity environments. The embodiments are attachable to multiple types of waste management systems via an umbilical, e.g., utility conduit, connection. The embodiments provide an inflatable ergonomic seating to enable better posture and easier bowel movements. The embodiments accommodate different body types, handles multiple types of human waste in different forms (solid/liquid/gas) simultaneously, and are expected to improve overall user experience. For example, the embodiments may be customized to include different nozzle patterns for genders, etc. The plastic components of the garment may be fabricated via an additive manufacturing processes.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A toilet for a zero-gravity condition, comprising:
a seat extending from a first end to a second end, and from a first side to a second side;
a leg rest at the first end of the seat that is level with the seat;
a backrest at the second end of the seat that extends away from the seat, toward an outer end of the toilet,
a first sidewall at the first side of the seat and a second sidewall at the second side of the seat, wherein the sidewalls extend away from the seat toward the outer end of the toilet;
a basin extending away from the seat toward an inner end of the toilet;
a first inflatable member extending about the leg rest, the sidewalls and the backrest,
wherein the first inflatable member is configured to inflate against a back, sides and under legs of a person seated against the seat.

2. The toilet of claim 1, wherein
the seat is removably supported by the toilet.

3. The toilet of claim 1, wherein:
the sidewalls respectively define first ends that face the outer end of the toilet and second ends that faces away from the backrest; and
the first inflatable member extends along the first ends and the second ends of the sidewalls.

4. The toilet of claim 3, wherein
the backrest is taller than each of the sidewalls, and the first inflatable member extends along the backrest so that it is level with the first ends of each of the sidewalls.

5. The toilet of claim 4, wherein:
the leg rest includes a center partition that extends away from the seat, toward the outer end of the toilet, to define adjacent first and second leg-rest cavities between the sidewalls, and
the first inflatable member extends over the center partition,
wherein when the person is seated against the seat, the first inflatable member is configured to inflate under and partially around the legs of the person.

6. The toilet of claim 5, wherein
a waste outlet port is defined at the inner end of the toilet.

7. The toilet of claim 3, wherein
the first sidewall defines a first outer corner where the first and second ends of the first sidewall meet, and the second sidewall defines a second outer corner where the first and second ends of the first sidewall meet, and the toilet includes:
a lap bar having opposing ends that are spaced apart from each other by a distance that is complimentary to spacing between the sidewalls, wherein the lap bar is configured to be positioned against the outer corners of the sidewalls and extend continuously therebetween, and wherein the lap bar is configured to be releasably fixed against the outer corners of the sidewalls; and
a second inflatable member extending between the opposing ends of the lap bar,
wherein, when the person is seated against the seat, the second inflatable member is configured to inflate against portions of the legs and waist of the person that are otherwise exposed by the first inflatable member to form a seal around the person.

8. The toilet of claim 7, including
a spray nozzle extending into the basin, between the inner end of the toilet and the seat, wherein the spray nozzle is configured to direct a spray toward the seat.

9. The toilet of claim 7, including
an air duct extending through the backrest, between the seat and the first inflatable member, and the air duct is configured to direct air toward the seat.

10. The toilet of claim 1, wherein
the sidewalls respectively define pockets with gloves extending therethrough.

11. A garment for disposing human waste in a zero-gravity condition, comprising:
a pelvis enclosure, extending from an outer end to an inner end;
a waist opening at the outer end of the garment;
the inner end of the garment defines leg openings and a waste collection chamber between the leg openings,
wherein the waste collection chamber includes:
a conduit connector that defines a plurality of ports, including a fluid inlet port and a waste outlet port; and
a baffle fluidly coupled to the fluid inlet port, wherein the baffle defines a fluid nozzle that is configured to direct a fluid flow from the fluid inlet port toward the outer end of the garment,
wherein when a person is wearing the garment, the baffle is configured to be located between legs, and adjacent to a perineum, of the person.

12. The garment of claim 11, further comprising
leg sleeves extending away from respective ones of the leg openings to sleeve ends.

13. The garment of claim 12, further comprising
inflatable members at each of the waist opening and the sleeve ends, wherein when the garment is worn by the person, the inflatable members are configured to inflate about a waist and the legs of the person to create a seal.

14. The garment of claim 13, wherein
a rigid shell surrounds the waste collection chamber.

15. The garment of claim 14, wherein
the rigid shell is formed of plastic and the leg sleeves are formed of silicone.

16. The garment of claim 11, wherein:
the plurality of ports further includes a first gas inlet port; and
a conduit within the waste collection chamber is fluidly connected to the first gas inlet port, wherein the conduit defines a first gas nozzle that is configured to direct gas flow from the first gas inlet port into the waste collection chamber.

17. The garment of claim 16, including:
a pinch valve to control outflow from at least one of the baffles and the conduit.

18. The garment of claim 11, wherein
the garment defines a gloved opening that is configured to provide access into the waste collection chamber.

19. A system including:
the garment of claim 11; and
an inflatable seat with hand grips with a seating zone that is configured to be positioned against the inner end of the garment.

20. The system of claim 19, comprising
magnets disposed along the seating zone of the inflatable seat and the inner end of the garment to prevent slipping motion between the garment and the inflatable seat.

* * * * *